United States Patent Office 3,826,809
Patented July 30, 1974

3,826,809
LEACHING OF METAL VALUES FROM
VARIOUS ORES
Bruce Alfred Hardwick and John Howard Patterson, East Roseville, New South Wales, Australia, assignors to The Oil Shale Corporation (Australia)
No Drawing Filed Sept. 15, 1972, Ser. No. 289,468
Claims priority, application Australia, Oct. 7, 1971, 6,562/71
Int. Cl. C01g 31/00, 39/00
U.S. Cl. 423—61                    4 Claims

ABSTRACT OF THE DISCLOSURE

In a method of recovering vanadium or molybdenum metal values from the ash of a roasted ore by leaching an aqueous slurry thereof with a water soluble reagent of the carbonate/bicarbonate type, the improvement comprising first maintaining the slurry in the presence of free lime for a sufficient period at a selected temperature to condition the ash, thereby significantly increasing the recovery of metal values therefrom in the subsequent leaching step. Typically, the slurry is conditioned for a period of about ½ day at a temperature of about 80° C. Since calcium carbonate is decomposed readily by roasting into free lime, the invention is very conveniently applicable to ores containing a high content of calcium carbonate.

---

This invention provides a method of improving the leaching of metal values from various ores. More particularly, the invention provides a method of improving the leaching of vanadium and/or molybdenum values from the ash obtained by roasting low grade ores containing a high content of calcium carbonate.

The invention owes its origin to difficulties encountered when seeking to provide an economic method of recovering vanadium and molybdenum from the deposits of vanadiferous shale at Julia Creek in Queensland.

These shale deposits comprise low contents of vanadium and molybdenum (about 0.3% V and about 0.03% Mo), together with a high content of calcium carbonate (up to 50%), kerogen (up to 20%), quartz (up to 25%), pyrite (up to 5%), and traces of micas and clays. The content of kerogen is relatively much higher in the underground shale deposits—the case of oil shale— than in the weathered surface shale deposits (where in fact there may be no kerogen), and the underground deposits therefore constitute a valuable source of fuel oil.

The vanadium is contained predominantly in a mixed layer montmorillonite/mica type of clay mineral; and the molybdenum is contained in separate phases associated with iron, namely pyrite (in the case of oil shale) or geothite (in the case of weathered shale).

According to standard practice for recovering commercially valuable fuel oil from oil shale, the latter is retorted at a temperature between about 400° and about 500° C. under non-oxidative conditions, thus volatilising the oil from its precursor (kerogen), and leaving a residue of spent shale. In the case of Julia Creek oil shale, the vanadium and molybdenum values after retorting are found to have remained in the spent shale together with inter alia the calcium carbonate.

Methods have been proposed hitherto for recovering vanadium from vanadiferous ores generally in which the ore is crushed, roasted under oxidative conditions at a temperature of the order of 800° C., and then leached with sulphuric acid. Standard procedures, for example including the step of solvent extraction with di-2-ethyl hexyl phosphoric acid in kerosene, are then available for treating the leach liquors to obtain therefrom the vanadium (typically recovered as $V_2O_5$).

Similarly, it has been found possible to recover vanadium and molybdenum from Julia Creek shale deposits by methods including roasting the shale (possibly after a retorting step to recover fuel oil), and then leaching the roasted shale with a suitable reagent. Hereinafter, roasted shale—whether derived from underground or weathered shale deposits—is termed "shale ash" or "ash."

When a shale containing calcium carbonate is roasted at temperatures above about 600° C., and particularly at temperatures approaching 800° C., it will be appreciated that the process is inherently liable to transform the calcium carbonate into free lime with evolution of carbon dioxide. As for the case of recovering vanadium from vanadiferous ores generally, sulphuric acid is a possible reagent for leaching vanadium and molybdenum values from Julia Creek shale ash. However, because of the combination in this ash of quite low vanadium and molybdenum contents and an unusually high total content of acid reactive material (calcium carbonate and derivative free lime), it has been found that the requirement of sulphuric acid for a given recovery of vanadium and molybdenum is so high as to render the total process uneconomic.

In the course of experiments leading up to the invention, there has been an extensive investigation into the various parameters relevant both to the preparation by roasting of Julia Creek shale and to the process of leaching the resulting shale ashes with different reagent systems.

As a result of this investigation, it has been found possible to achieve satisfactory recoveries of vanadium and molybdenum (for example, 65%) by leaching Julia Creek shale ashes with aqueous reagents selected from the group consisting of carbonates and bicarbonates, all of which tend to be incompletely reactive with calcium carbonate. For convenience hereinafter, they are sometimes referred to generically as "carbonate" reagents.

Typical members within this group are (i) alkaline reagents such as sodium carbonate, sodium bicarbonate, and mixtures thereof; ammonium carbonate, ammonium bicarbonate, and mixtures thereof; and the product of passing carbon dioxide into aqueous ammonia (referred to hereinafter as "carbonated amonia"); and (ii) the weakly acidic reagent carbon dioxide/water.

While satisfactory recoveries of vanadium and molybdenum can be achieved with carbonate reagents, it is a disadvantage that the unrecovered fraction of these metal values can still be high.

It is accordingly an object of the invention to provide a method of improving the recovery of vanadium and/or molybdenum values when using a carbonate reagent to leach an ash comprising such values and having a high content of calcium carbonate.

The invention is predicated on the surprising discovery that, when shale ashes were prepared from Julia Creek shale by roasting at a temperature above about 600° C., the subsequent recovery of vanadium and molybdenum therefrom by leaching with a carbonate reagent was dramatically improved by first conditioning the ashes as explained hereinafter in a non-leaching medium comprising water.

Flowing from this discovery, a method has now broadly been provided of treating an ore to recover therefrom metal values selected from the group consisting of vanadium and molybdenum, said method comprising the steps of:

(i) roasting the ore to an ash;
(ii) forming an aqueous slurry of the ash; and
(iii) leaching said values from the ash by introducing into the slurry a water soluble reagent selected from the group consisting of a carbonate and a bicarbonate;

said method being further characterized in step (ii) by maintaining the slurry in the presence of free lime for a sufficient period at a selected temperature to condition the ash and thereby improve the recovery of said values in step (iii). As explained subsequently herein, this requirement regarding free lime is met inherently in the case of an ash prepared from Julia Creek shale by roasting at a temperature above about 600° C.

Hereinafter, unless the contrary is conveyed, references to vanadiferous shale are to be understood as relating to a vanadiferous shale comprising both vanadium and molybdenum values and having a content of calcium carbonate.

By way of general illustration, when a vanadiferous weathered shale is roasted to a temperature above about 600° C., it is found possible typically to obtain a recovery of vanadium of only about 25% when the ash is leached immediately at ambient temperature with carbonated ammonia; however, when the same ash is first conditioned by immersion for 1 day in water at 80° C., a recovery of vanadium typically of about 60% is obtained when leaching is then carried out with the same reagent under the same conditions. Significant improvements in the leaching of molybdenum values are also achieved by first conditioning this ash in the same way.

In the course of the mentioned experiments leading up to the invention, it has been shown that—when leaching an unconditioned vanadiferous shale ash with a carbonate reagent—the realisable recoveries of vanadium and molybdenum (particularly the former) are generally dependent on the temperature at which the ash has been prepared. For example, it has been shown that vanadium recoveries from Julia Creek weathered shale can be improved from about 20% to about 75% simply by increasing the temperature of roasting from about 600° to about 950° C.

By practising the method of the invention, it has been found possible to improve the recoveries of both vanadium and molybdenum from vanadiferous shale ashes prepared at both low and high temperatures. In particular, it has been found possible to condition an ash prepared at a low temperature whereby to enable vanadium recoveries therefrom hitherto only possible form an ash prepared at a high temperature.

Not surprisingly therefore, the invention finds its greatest application in improving the leaching of vanadium from a vanadiferous shale ash which has been prepared at a low temperature.

It will be appreciated that the calorific requirement for roasting a vanadiferous weathered shale (which contains little or no kerogen) cannot wholly be met by the calorific content of the shale itself. Since the calorific requirement for roasting in this case must be acquired from outside resources, it would be preferred for economic reasons to roast a weathered shale at the lowest possible temperature. The invention therefore finds particular application in improving the leaching of vanadium from the ash obtained from vanadiferous weathered shales.

For any given improvement in the recovery particularly of vanadium values, it has been found that the period required for conditioning a vanadiferous shale ash according to the invention is highly temperature-dependent. For example, the period of conditioning required to achieve a given improvement in recovery can be reduced by a factor of at least 10 when the temperature of conditioning is increased from about 20° to about 80° C. While periods of many days may be required to achieve a desired improvement when conditioning is carried out at ambient temperature, it has been found that a maximum (or near maximum) improvement of leaching can be achieved for virtually all Julia Creek vanadiferous shale ashes if they are first conditioned according to the invention for a period within the range about ½ day to about 2 days at about 80° C. Preferably, the period is about ½ day at this temperature. By further raising the temperature of conditioning, it will be understood that the period required can be further reduced correspondingly; and vice versa.

As mentioned hereinbefore, the practice of the invention involves maintaining an aqueous slurry of ash in the presence of free lime for a period sufficient to condition the ash. As used herein, it will be understood that free lime means calcium hydroxide and/or calcium oxide available for reaction.

While the resulting improvement in leaching by carbonate reagents is not fully understood, it appears likely that the effect is attributable to the occurrence of independent reactions between separate phases in the ash containing the metals in question (vanadium or molybdenum) and free lime in solution.

In support of this hypothesis, it has been found that— in the case of ash from a Julia Creek vanadiferous shale— if the content of free lime in the ash is less than about 2%, a significant improvement in leaching cannot be achieved by maintaining the slurry for even a very long period of time. As described herein, contents of free lime in the ash are given with respect to CaO and are all determined by the standard "sucrose" method.

If no remedial measure (such as addition of lime to the slurry) is contemplated, this finding in practice sets a critical lower limit of about 2% for the free lime content of a Julia Creek shale ash suitable for conditioning according to the invention.

Alternatively, if for example additions of lime to the slurry are contemplated, it is a corollary of the finding that—in the slurry formed from a Julia Creek shale ash having a free lime content less than about 2%—noticeable improvements in the recovery particularly of vanadium values therefrom can only be achieved if an appropriately compensating quantity of free lime is first added to the slurry.

In further support of the mentioned hypothesis, it has been found that, while maximum improvements in leaching have been recorded when applying step (ii) of the inveniton to a slurry formed from a Julia Creek shale ash having a free lime content of about 8% by weight, no improvement in leaching is recorded when the free lime content of the ash is first substantially eliminated (as by extraction with sucrose or ethylene glycol or neutralisation with carbon dioxide).

These findings emphasise the importance of the role played by free lime in the conditioning process, and suggest that the free lime is involved in reactions with phases containing the metals in question whereby metal values are made available for subsequent leaching.

While therefore the invention has been conceived primarily in relation to improving the recovery of vanadium and/or molybdenum values from the ash obtained by roasting an ore containing a high content of calcium carbonate, it will be appreciated from the above that the invention also has application to the conditioning of an ash obtained by roasting an ore having a low content (possible a zero content) of calcium carbonate. In these cases, provided the calcium carbonate content is not too low, it is possible to select roasting conditions (for example, involving the use of a high temperature such as 950° C.) which favour the decomposition of calcium carbonate to such an extent that a quantity of free lime is produced sufficient for successful conditioning. On the other hand, if the calcium carbonate content of the ore is too low, it is possible instead either to add an appropriate quantity of calcium carbonate to the ore prior to roasting, or (as suggested hereinbefore) to add an appropriate quantity of free lime to the slurry prior to conditioning.

The invention can be practised conveniently by feeding the ash batchwise after roasting into holding tanks containing water. Preferably, the tanks are equipped with means for gently agitating the slurry of ash and water during the selected conditioning period.

Since metallurgical operations are frequently carried out in geographical locations characterized by high ambient temperatures and prolonged sunlight, a desirably elevated temperature for conditioning (for example, 80° C.) may be maintained conveniently by making use of solar energy. The tanks can be provided with means known per se (such as reflecting means) for implementing this method of maintianing a desired conditioning temperature.

The invention is now illustrated with reference to a number of laboratory scale examples.

Example 1

This example relates to samples of ash which were prepared from Julia Creek weathered shale by roasting in a muffle furnace, conditioned (if at all) in water, and then leached at ambient temperature (20° C.) with carbonated ammonia. The example explores those variations in the recoveries of vanadium and molybdenum which could be attributed to variations in (i) the temperature of roasting the shale, and (ii) the period of conditioning.

A quantity of weathered shale was divided into four samples. Each sample was roasted at a different temperature, and each resulting ash was divided into control and experimental ashes. The control ash in each case was submitted immediately to leaching, while the experimental ashes before leaching were first conditioned for different periods in water at 60° C.

Recoveries (percent) of vanadium and molybdenum in the various cases are given in Table 1.

It is apparent from the results given therein (i) that higher recoveries of vanadium and molybdenum are generally associated with roasting at higher temperatures; (ii) that conditioning invariably leads to higher recoveries of both these values; and (iii) that, in the case of vanadium, the improvement in recovery is greater for ashes prepared at lower temperatures.

TABLE 1

| Roasting temperature (° C.) | Vanadium recovery (percent) for periods of conditioning— | | | | Molybdenum recovery (percent) for periods of conditioning— | | | |
|---|---|---|---|---|---|---|---|---|
| | 0 (a), hr. | 24 hrs. | 48 hrs. | 72 hrs. | 0 (a), hr. | 24 hrs. | 48 hrs. | 72 hrs. |
| 750 | 43 | 54 | 69 | 73 | 57 | 61 | 66 | 63 |
| 850 | 53 | 60 | 67 | 70 | 56 | 69 | 71 | 67 |
| 950 | 75 | 81 | 80 | 85 | 69 | 80 | 80 | |
| 1,050 | 77 | 86 | 86 | 85 | 69 | 82 | 85 | 84 |

NOTE.—(a) denotes control ash.

Example 2

This example relates to samples of ash which were prepared from spent Julia Creek oil shale by roasting in a fluidised bed furnace, conditioned (if at all) in water, and then leached at ambient temperature (20° C.) with carbonated ammonia. The example explores those variations in the recoveries of vanadium which could be attributed to variations in (i) the temperature of conditioning, and (ii) the period of conditioning.

Two different samples of spent shale were roasted at a temperature of about 790° C. and the resulting ashes, $X$ and $Y$, were each divided into control and experimental categories. The control ashes were submitted immediately to leaching, while the experimental ashes before leaching were first conditioned for different periods in water at temperatures selected from: ambient temperature (20° C.), 58.5° C., and 80° C.

Recoveries (percent) of vanadium in the various cases are given in Table 2.

It is apparent from the results given in the Table that higher recoveries of vanadium are obtained by conditioning the ash for the same periods at higher temperatures, and that substantially maximum recoveries can be obtained by conditioning the ash for as little as about ½ day at 80° C.

TABLE 2

| Ash sample | Conditioning temperature (° C.) | Conditioning period (hr.) | Vanadium recovery (percent) |
|---|---|---|---|
| X | 20 | (a) 0 | 60 |
| | | 24 | 64 |
| | | 72 | 70 |
| | | 168 | 76 |
| | | 264 | 77 |
| | | 336 | 80 |
| X | 58.5 | (a) 0 | 60 |
| | | 24 | 75 |
| | | 48 | 83 |
| | | 72 | 83 |
| Y | 80 | (a) 0 | 65 |
| | | 6 | 66 |
| | | 8 | 74 |
| | | 10 | 75 |
| | | 12 | 77 |
| | | 16 | 82 |
| | | 48 | 83 |

NOTE.—(a) denotes control ash.

Example 3

A quantity of ash was prepared from spent Julia Creek oil shale by roasting in a fluidized bed furnace at 790° C. The ash was divided into portions $A$ and $B$ and the treatment of portion $B$ described below illustrates the invention.

Portion $A$ was submitted immediately to leaching at 100° C. (atmospheric pressure) with a reagent consisting of an aqueous mixture of sodium carbonate and sodium bicarbonate.

Portion $B$ was first conditioned for 20 hours in water at 80° C. before leaching under the same conditions with the same reagent.

The recovery of vanadium from portion $B$ was 61% compared with 26% from portion $A$.

Example 4

A quantity of Julia Creek weathered shale was roasted at 755° C. in a fluidised bed furnace. The ash was divided into portions $A$ and $B$, and the treatment of portion $B$ described below illustrates the invention.

Portion $A$ was submitted immediately to leaching at 60° C. with a reagent consisting of carbon dioxide/water in the presence of a commercially available anion exchange resin (Dowex 21 K). (The technique of using such a resin when leaching with carbon dioxide/water is discussed in United States Pat. No. 3,656,936 by Haas.)

Portion $B$ was first conditioned for 48 hours in water at 80° C. before leaching under the same conditions with the same reagent.

The recovery of vanadium from portion $B$ was 48%, compared with 24% from portion $A$.

Example 5

This example relates to samples of ash which were prepared from Julia Creek weathered shale by roasting in a muffle furnace at a low temperature, conditioned (if at all) in a slurry comprising water per se or water comprising various quantities of added free lime, and then leached at ambient temperature (20° C.) with carbonated ammonia. The example explores those variations in the recovery of vanadium which could be attributed to the contrived variations in the free lime content of the slurry.

A quantity of weathered shale was divided into three portions. Each portion was roasted at a different low temperature and each resulting ash was divided into seven numbered samples. Various amounts of free lime were then added to selected samples, and these were then leached—either immediately, or after conditioning in a slurry with water for 48 hours at 80° C.

Recoveries (percent) of vanadium for the various numbered samples are given in Table 3.

It is apparent from the results given:

(i) that, where the slurries contain less than 2% free lime by weight based on ash (as in for example samples 1, 2 and 8, 9), vanadium recovery is not improved by the mere step of maintaining them for a conditioning period prior to leaching (the case of samples 2 and 9);

(ii) that vanadium recovery is not really improved by the mere addition of free lime to a slurry (compare sample 7 with sample 1); and (iii) that vanadium recovery is improved by increasing the free lime content of the slurry up to a total of about 8% based on ash, but that any further increase in the free lime content is not attended by any significant further improvement in vanadium recovery.

TABLE 3

| Ashing temperature (° C.) | Sample number | Free CaO in slurry by weight of ash (percent) | | Vanadium recovery (percent) |
|---|---|---|---|---|
| | | Added | Total | |
| 500 | *1 | Nil | 1.6 | 16 |
| | 2 | Nil | 1.6 | 15 |
| | 3 | 1.25 | 2.85 | 22 |
| | 4 | 2.5 | 4.1 | 41 |
| | 5 | 5 | 6.6 | 41 |
| | 6 | 7.5 | 9.1 | 45 |
| | *7 | 12.6 | 14.2 | 18 |
| 570 | *8 | Nil | 1.8 | 19 |
| | 9 | Nil | 1.8 | 19 |
| | 10 | 2.5 | 4.3 | 30 |
| | 11 | 4.5 | 6.3 | 42 |
| | 12 | 6.3 | 8.1 | 53 |
| | 13 | 9.9 | 11.7 | 52 |
| | 14 | 13.7 | 15.5 | 57 |
| 620 | *15 | Nil | 3.4 | 17 |
| | 16 | Nil | 3.4 | 36 |
| | 17 | 1.2 | 4.6 | 36 |
| | 18 | 3 | 6.4 | 56 |
| | 19 | 5 | 8.4 | 62 |
| | 20 | 6.6 | 10 | 62 |
| | 21 | 11.6 | 15 | 62 |

*Not conditioned prior to leaching.

Example 6

This example relates to samples of ash which were prepared from spent Julia Creek oil shale by roasting in a fluidised bed furnace, conditioned (if at all) in a slurry comprising water *per se* or water containing various quantities of added free lime, and then leached at 60° C. with carbon dioxide/water in the presence of a commercially available anion exchange resin (Dowex 21 K).

A quantity of the spent shale was divided into two portions. The portions were roasted at different temperatures (710° and 790° C.) and the resulting ashes were divided into various numbered samples (respectively 1 to 6 and 7 to 10). Various amounts of free lime were then added to selected samples, and these were then leached—either immediately or after conditioning in a slurry with water for 48 hours at 80° C.

Recoveries (percent) of vanadium for the various numbered samples are given in Table 4.

It is apparent from the results given:

(i) that, where a slurry contains only 2% free lime by weight based on ash (as in samples 1 and 2), vanadium recovery is not improved by the mere step of maintaining it for a conditioning period prior to leaching (the case of sample 2);

(ii) that vanadium recovery is not really improved by the mere addition of free lime to a slurry (compare sample 6 with sample 1);

(iii) that vanadium recovery is improved by increasing the free lime content of the slurry up to a total of the order of 5% to 7% based on ash, but that any further increase in the free lime content is not attended by any significant further improvement in vanadium recovery; and (iv) that, where the slurry contains about 7% free lime by weight based on ash, vanadium recovery is improved to a maximum extent by conditioning the slurry without augmenting its content of free lime (as in sample 8).

TABLE 4

| Ashing temperature, ° C. | Sample number | Free CaO in slurry by weight of ash, percent | | Vanadium recovery, percent |
|---|---|---|---|---|
| | | Added | Total | |
| 710 | ¹1 | Nil | 2 | 36 |
| | 2 | Nil | 2 | 37 |
| | 3 | 3 | 5 | 48 |
| | 4 | 5 | 7 | 48 |
| | 5 | 8 | 10 | 49 |
| | ¹6 | 10 | 12 | 39 |
| 790 | ¹7 | Nil | 6.7 | 45 |
| | 8 | Nil | 6.7 | 68 |
| | 9 | 0.8 | 7.5 | 64 |
| | 10 | 8.3 | 15 | 66 |

¹ Not conditioned prior to leaching.

What is claimed is:

1. A method of treating oil shale, including weathered oil shale, to recover therefrom metal values selected from the group consisting of vanadium and molybdenum which comprises the steps of
   (a) roasting said ore to form shale ash;
   (b) forming an aqueous slurry containing the shale ash and at least about 2% free lime based on the weight of the shale ash and maintaining the slurry at a conversely related temperature-minimum time period of from about 20° C. for at least about 24 hours to about 80° C. for at least about 8 hours to condition the shale ash and thereby improve the recovery of said values by subsequent leaching of the conditioned shale ash; and
   (c) leaching said values from said conditioned shale ash by introducing into the slurry a water-soluble carbonate reagent selected from the group consisting of sodium carbonate, sodium bicarbonate, and mixtures thereof; ammonium carbonate, ammonium bicarbonate, and mixtures thereof; the product of passing carbon dioxide into aqueous ammonia; and carbon dioxide/water.

2. The method as defined by claim 1 wherein the free lime is provided at least in part by adding free lime to the slurry before conditioning.

3. The method as defined by claim 1 wherein the free lime is provided at least in part by roasting said ore containing calcium carbonate to form shale ash containing free lime.

4. The method as defined by claim 1 wherein the shale ash is conditioned by maintaining said aqueous slurry for a period of about a half day at a temperature of about 80° C.

References Cited
UNITED STATES PATENTS

| 3,429,693 | 2/1969 | Bauer et al. | 423—68 |
| 3,567,433 | 3/1971 | Gutnikov | 423—53 |
| 2,920,936 | 1/1960 | Dille et al. | 423—68 |
| 2,255,059 | 9/1941 | Houdry | 423—62 |

HERBERT T. CARTER, Primary Examiner

U.S. Cl. X.R.

423—53, 62, 68